June 30, 1942.  A. CLAUD-MANTLE  2,287,782
ASSIST CORD ASSEMBLY
Filed Feb. 23, 1940  2 Sheets-Sheet 1

Inventor
Arthur Claud-Mantle
By Rockwell Bartholow
Attorneys

June 30, 1942.  A. CLAUD-MANTLE  2,287,782
ASSIST CORD ASSEMBLY
Filed Feb. 23, 1940   2 Sheets-Sheet 2

Inventor
Arthur Claud-Mantle
By Rockwell Bartholow
Attorneys

Patented June 30, 1942

2,287,782

UNITED STATES PATENT OFFICE 2,287,782

ASSIST CORD ASSEMBLY

Arthur Claud-Mantle, Trumbull, Conn., assignor to The Bassick Company, Bridgeport, Conn., a corporation of Connecticut Application February 23, 1940, Serial No. 320,390

22 Claims. (Cl. 105—354)

This invention relates to assist cords such as used in motor cars.

One of the objects of the invention is to provide an improved assist cord of the spring-controlled type, where the body of the assist member is in the form of a strap or web, and where the assist member is swingable in the plane of the strap or web material. Such a device is useful where the assist member is mounted in proximity to a forwardly and upwardly inclined mullion or quarterpost of an automobile body, for the assist strap, which is usually in the form of a loop, may normally have an inclined position so as to be concealed behind the mullion, although when in use capable of being swung into various other positions, including a vertical position. When released, the assist member is returned by the spring to the normal position. Such a spring-controlled device is useful also in other relations.

A further purpose which I have in view is the provision of an assist cord assembly having numerous advantages in use, and which, nevertheless, is of relatively simple and inexpensive construction.

To these and other ends the invention consists in the novel features and combinations of parts to be hereinafter described and claimed.

Figure 1:
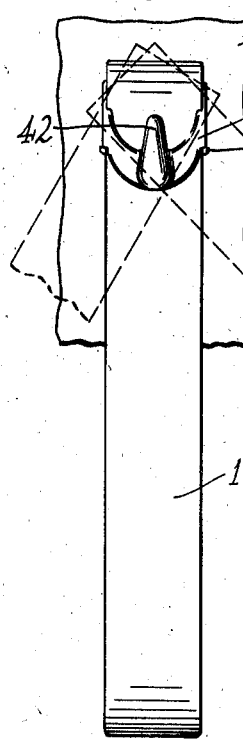
Fig. 1 is a front elevation of an assist cord assembly embodying my improvements, the car body wall being illustrated in a fragmentary manner, and the normal position of the assist member being illustrated as vertical in this particular instance.
Figure 2:
Fig. 2 is a side elevation of the parts shown in Fig. 1.

In the form of assist cord which has been selected as illustrative, the assist member comprises a strap or web of textile material formed as a loop. Opposite ends of a piece of strap material are overlapped and interconnected to form a permanent continuous loop. A grommet passes through the overlapped interconnected ends and is adapted to receive a fastener such as a screw by means of which the loop is supported to swing in the plane of its strap material. Back of the loop member and extending around the fastener is a case containing a spring acting on the loop member to hold it normally in a predetermined angular position. An ornamental or trim member usually carrying an upwardly directed garment hook is associated with the upper suspending portion of the textile loop when the parts are in the operative or assembled position.

In the drawings, a portion of the wall of the motor car body is shown at 15, the assist loop at 16, the trim member at 17, the fastener screw at 18, and the spring case at 19. The loop 16 can be made of the usual textile web or strap material, and may have the usual edge binding and other features of construction which I have not considered it necessary to illustrate. The loop is formed by cutting off a suitable length of material, looping it, slightly overlapping it at the extremities 16a and 16b, and interconnecting the overlapped ends by stitching them together and passing therethrough a grommet 20 of a size such as to fit the smooth body or shank of the screw 18.

The spring case 19 is preferably a round case in the form of a shallow cup having an opening 21 at the rear adapted to receive a reduced portion 22 of the screw 18, and to be held against the car body wall by a shouldered portion 23 on the screw. Behind the portion 22 the screw has the screw-threaded portion 24, which has threaded engagement in a socket on the wall, formed in a suitable manner, as by welding a small interiorly threaded block 25 to the wall at the rear face of the latter.

Figure 4:
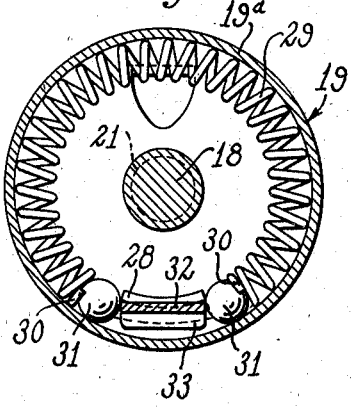
Fig. 4 is a section on line 4—4 of Fig. 3.

The spring case is preferably provided in its rear wall with a struck-up tongue 26 rearwardly directed and adapted to be received in a correspondingly formed opening 27 in the supporting wall, so as to prevent the case from rotating. At the lower part of its rear wall the case is provided with a forwardly directed arcuate lug 28. This lug is adapted to hold in operative position a spring for controlling the swinging movement of the assist loop, and this spring is preferably constituted by a coil or helix 29 of fine spring wire. The spring coil when in the operative position is given a curved or arcuate shape, the form of the spring being approximately circular. It is held in this position within the case 19, which is of cup-like form, with its peripheral wall 19ª curled or curved over, so that after the spring has been compressed endwise to a certain degree and inserted into the peripheral portion of the case, it will be retained in the curved form. The extremities of the coil are shown at 30 in Fig. 4, and it will be observed that between the respective extremities and the respective ends of arcuate lug 28 small steel balls 31 are interposed.

Figure 3:
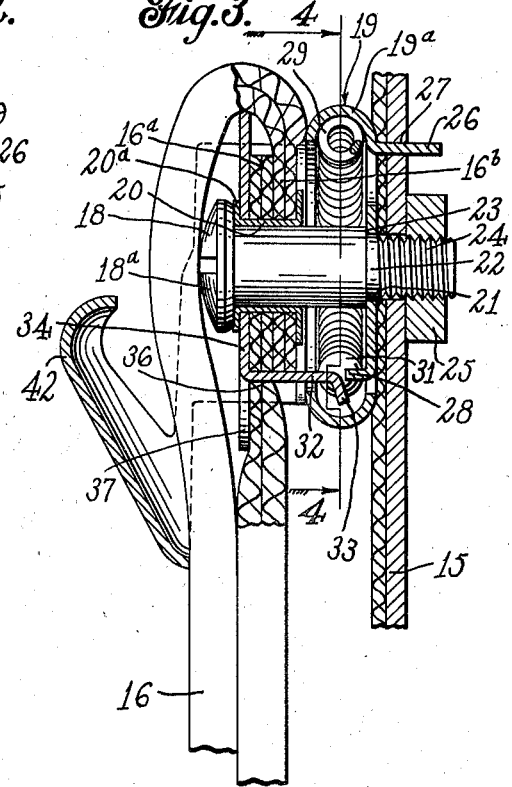
Fig. 3 is an enlarged vertical sectional view of the upper part of the assembly.

Approximately opposite the lug 28, a lug 32 enters the case 19 from the open front portion thereof, said lug having a downturned end 33 which is disposed between and adapted to be engaged by the balls 31. In width the lug 32 is substantially co-extensive with the lug 28. This lug 32 is formed integrally with a spring-pressed plate 34 located between the front and rear portions of the textile loop. The lug 32 is struck up from the lower part of this plate, whereas the upper part of the plate acts as a stop or abutment for the upper part of the loop, as shown in Fig. 3, when the parts are in assembled position. The plate has a hole 35 which permits it to be fitted nicely around the grommet 20, and it is clinched against the front face of end portion 16ª of the strap by the front flange 20ª of the grommet. At the rear the grommet has a somewhat wider flange 20ᵇ clinched against the rear face of end portion 16ᵇ. The lug 32 passes through a slot 36 cut through the rear portion of the loop, and passes rearwardly into the spring case, with its downturned end 33 in the location previously described.

It will be seen that the construction above described provides for the swinging movement of the textile loop in the plane of the strap material, with the fastener screw acting as a pivot. The grommet, clinched to the assist loop, is free to turn on the cylindrical body portion of the screw behind the screw head 18ª, the rear face of which head substantially abuts the front face of the grommet. Downward pull on the outer portion or flap of the loop is transmitted to the stop plate 34. The arcuately curved spring helix acts at its ends against the respective sides of lug portion 33 of the stop plate, and normally holds the assist loop in a predetermined angular position, which in this instance is that shown in full lines in Fig. 1. The loop can be swung on its pivot either forwardly or rearwardly, and in either case the plate lug acts on one end of the spring to compress the spring. The result is that when the assist loop is released the spring immediately returns it to the normal position. One of the advantages arising from the fact that the spring is double acting, i. e., returns the loop when the latter is swung in either direction, is that the device can be mounted and successfully used at either side of the car body behind an inclined mullion or quarterpost.

The ornamental or trim member 17 previously referred to is removably mounted on the stop plate 34. It will be seen that at either side of lug 32, plate 34 is provided with side portions 37 having shoulders 38 at their lateral edges. Above these shoulders the side edges 39 of the plate are preferably straight so as to act as guides for the trim member, while the shoulders 38 act as stops for said member.

Figure 10:
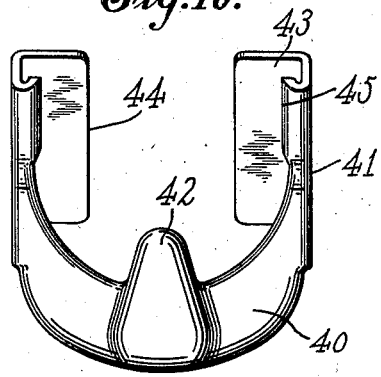
Fig. 10 is a front perspective view of the trim member which is adapted to be slid over the plate.
Figure 11:
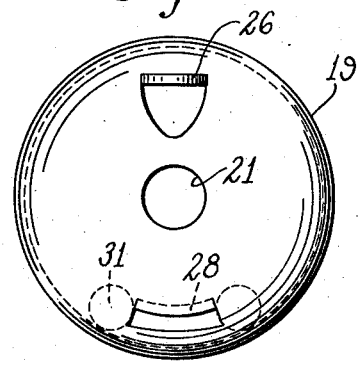
Fig. 11 is a rear view of the spring case.

The trim member preferably has the structure shown in detail in Fig. 10, the same embodying a lower clip or keeper 40, adapted to extend over and across the outer portion or flap of the assist loop in the relation shown in Fig. 1. This clip portion 40 is preferably of arch shape, having its ends curved upwardly to side walls 41 of the trim member. The trim member is preferably made of a single piece of sheet metal, and the clip portion 40 is preferably provided with an upwardly and outwardly directed garment hook 42, which is arched in cross section. The side walls 41 extend rearwardly, and at their rear portions are integral with inturned lips or flanges 43, which in this particular form extend upwardly to a substantial distance from the regions where the clip portion 40 joins the side walls. The flanges or lips 43 have free inner edges 44 opposing each other and providing between them a relatively wide space or gap permitting the introduction of the assist loop into the trim member from the rear of the latter. In front of the flanges 43 the trim member has in association with the side walls thereof integral rearwardly turned portions 45, having edge portions 46 facing the plate 34 and adapted to contact the front face of said plate in the manner shown in Fig. 5.

In the assembled position, the side walls 41 of the trim member engage the edges 39 of the stop plate, and the bottom edges of the side walls rest on the shoulders 38. Preferably, in the assembled position, the top edges of side walls 41 are at the same level as shoulders 47 on the stop plate, and a portion 48 of the stop plate, which projects upwardly beyond the shoulders, serves as the stop portion of the plate against which the inner face of the upper portion of the assist loop engages for imposing load on the plate.

In the mounting of the device on the supporting wall, the fastener screw is passed through the rear part of the loop. The spring case is placed in position against the wall, and the screw is placed in its threaded socket in the wall and screwed up to hold the loop against the spring case with a certain amount of play. The trim member is then placed over both the front and rear portions of the loop (making use of the open rear portion of the trim member), the trim member at this time being located somewhat above the stop plate. The trim member is then pulled downwardly so that its channeled side portions slide over the front and rear portions of the loop and over the side edges of the stop plate, until the lower edges of the side walls of the trim member take up against the shoulders or stops 38. That portion of the loop extending upwardly beyond the stop plate is then practically eliminated by pulling downwardly on the outer side of the loop. This brings the parts to the assembled position, and nothing further is required.

When desired the device can be readily taken down or disassembled by a reversal of the operations above described.

Figure 5:
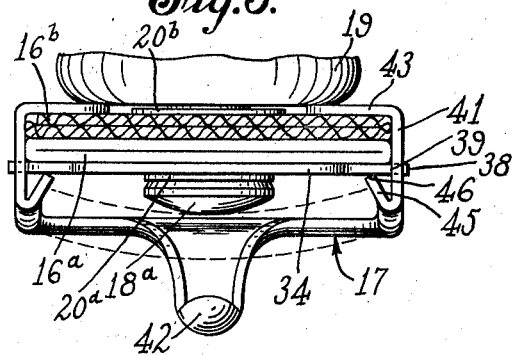
Fig. 5 is a top plan view of the parts shown in Fig. 3, a part of the textile web or strap being shown in section.
Figure 6:
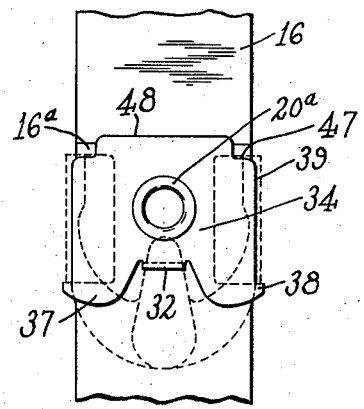
Figs. 6, 7 and 8 are, respectively, a front, side and rear view of a portion of the rear part of the looped strap showing the spring-pressed plate carried thereby.
Figure 7:
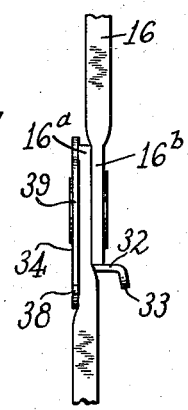
Figure 8:
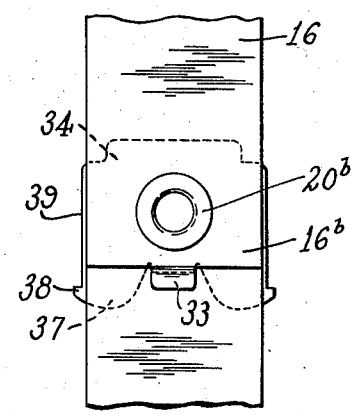
Figure 9:
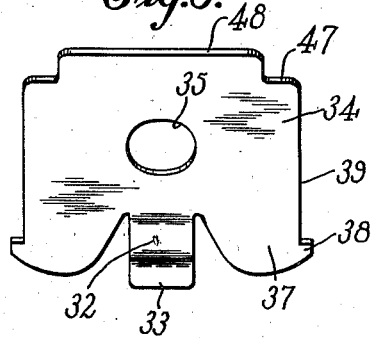
Fig. 9 is a rear perspective view of the spring-pressed plate, detached.

It will be noted from Fig. 5 that in the assembled position of the device the trim member at the rear portion thereof has its flanges or lips 43 resting against the spring case at the front of the latter. This provides a satisfactory bearing for the assist loop at the rear thereof, permitting swinging movement of the loop to take place without wear on the fabric.

By my invention a very simple and effective spring control of the assist member is provided. The parts of the device can be manufactured at relatively low cost, and are capable of very ready and convenient assemblage for shipment, and for application to the car at the factory. By the use of a stop plate which acts also as a means for taking the thrust of the spring and for energizing the spring, the device is made of simple construction and very strong and durable. The trim member can be very easily and conveniently placed in position to complete the assemblage, and gives a very ornamental effect; and the trim member is also very strongly supported and will not be displaced in any ordinary use, although on the other hand the disassemblage of the device can be very readily effected when that is desired.

While I have shown herein but a single embodiment of my invention, it will be understood that it is capable of many different embodiments, and that many modifications and changes in the organization of parts and in the details can be made without departing from the principles of the invention or the scope of the claims.

What I claim is:

1. In an assist cord assembly, the combination of an assist member in the form of a loop of strap material having approximately parallel portions facing each other, a fastener member having a shank serving as a pivotal mounting for said member adjacent the upper end thereof and providing for the swinging movement of the side portions of the member in the respective planes in which their strap material is disposed, a case into which said fastener member extends adapted for mounting on the side of the car body, and means including a spring in said case and a loop carried member projecting through the rear portion or flap of the loop member into cooperation with said spring for holding said loop member normally in a predetermined position in its plane of swing.

2. In an assist cord assembly, the combination of an assist member in the form of a loop of strap material having approximately parallel portions facing each other, a fastener member having a shank serving as a pivotal mounting for said member adjacent the upper end thereof and providing for the swinging movement of the side portions of the member in the respective planes in which their strap material is disposed, a case into which said fastener member extends adapted for mounting on the side of the car body, and means including a spring in said case and a spring controlled plate member clinched to said loop member in front of the rear portion or flap of the latter for holding the loop member normally in a predetermined angular position.

3. In an assist cord assembly, the combination of an assist member in the form of a loop of strap material having approximately parallel portions facing each other, a fastener member having a shank serving as a pivotal mounting for said member adjacent the upper end thereof and providing for the swinging movement of the side portions of the member in the respective planes in which their strap material is disposed, a case into which said fastener member extends adapted for mounting on the side of the car body, and means including a spring in said case and a plate member clinched to said loop member in front of the rear portion or flap of the latter for holding the loop member normally in a predetermined angular position, said plate member having a lug projecting through the fabric of the rear flap or portion into cooperation with said spring.

4. In an assist cord assembly, the combination of an assist member in the form of a loop of strap material having approximately parallel portions facing each other, a fastener member having a shank serving as a pivotal mounting for said member adjacent the upper end thereof and providing for the swinging movement of the side portions of the member in the respective planes in which their strap material is disposed, a grommet passing through the material of the loop member and surrounding said fastener member, a case extending around said fastener member at the rear of the loop, and means including a spring in said case and a spring controlled plate clinched to the loop member adjacent the front end of the grommet for normally holding said loop member in a predetermined angular position.

5. In an assist loop assembly, the combination of a loop member, a grommet passing through the loop member, a fastener surrounded by the grommet and by means of which the loop member is swiveled on a supporting wall, a round case attached to the wall around the fastener behind the loop member and having a forwardly projecting curled rim and also having a forwardly directed lug struck up from its rear wall, a helical spring held in the curled rim of the case and having its respective ends adjacent the ends of said lug, balls interposed between the ends of the spring and the ends of the lug, and a plate clinched to said loop member under the front end portion of the grommet and having a lug extending into the spring case in a position in which it can exert compressive action on said spring by engaging either of said balls.

6. In an assist loop assembly, a flexible strap in the form of a continuous loop having a grommet passing through one side only thereof, a supporting wall, a screw passing through the grommet into the supporting wall, a stop plate for the upper part of the loop held in place in front of the attached side of the loop by said screw, and a trim member having detachable connection with said plate.

7. In an assist loop assembly, a flexible strap in the form of a continuous loop having a grommet passing through one side only thereof, a supporting wall, a screw passing through the grommet into the supporting wall, a stop plate for the upper part of the loop held in place in front of the attached side of the loop by said screw, and a trim member having detachable connection with said plate, said plate and said trim member being slidable relatively to each other for assemblage and disassemblage.

8. In an assist loop assembly, a flexible strap in the form of a continuous loop having a grommet in one side thereof, a supporting wall, a loop pivoting screw passing through the grommet into the supporting wall, a spring case and spring held by the screw against the wall behind the loop, and a load-sustaining stop member for the upper part of the loop held in place adjacent the front end of the screw and connected to swing with the loop and having a part extending rearwardly into the spring case to cooperate with the spring.

9. In an assist loop assembly, a flexible strap in the form of a continuous loop having a grommet passing through one side only, a supporting wall, a loop pivoting screw passing through the grommet into the supporting wall, a spring case and spring held in place against the wall behind the loop by said screw, a load-sustaining plate member for supporting the upper part of the loop held in place by the screw in front of the attached side of the loop and connected to the loop to swing therewith, a part extending rearwardly from said plate member into said spring case to cooperate with the spring in normally holding the loop in a predetermined angular position, and a trim member detachably mounted on said plate member.

10. In an assist loop assembly, a flexible strap in the form of a loop having a grommet passing through one side only, a supporting wall, a screw passing through the grommet into said wall, a plate clinched to said loop by said grommet at the front face of the attached side of the loop, and a trim member detachably mounted on said plate.

11. In an assist loop assembly, a flexible strap in the form of a loop having a grommet passing through one side only, a supporting wall, a screw passing through the grommet into said wall, a plate clinched to said loop by said grommet at the front face of the attached side of the loop, and a trim member detachably mounted on said plate, said trim member having a clip extending across the unattached side of the loop.

12. In an assist loop assembly, a flexible strap in the form of a loop having a grommet passing through one side only, a supporting wall, a screw passing through the grommet into said wall, a plate clinched to said loop by said grommet at the front face of the attached side of the loop, and a trim member detachably mounted on said plate, said trim member having a clip extending across the unattached side of the loop, and said clip being provided with an upwardly directed hook.

13. In an assist loop assembly, a flexible strap in the form of a continuous loop having a grommet passing through one side only, a supporting wall, a screw passing through the grommet into the supporting wall, a plate attached to the loop under the front end portion of the grommet, and a trim member detachably mounted on said plate, said trim member having an open rear portion.

14. In an assist loop assembly, a flexible strap in the form of a continuous loop having a grommet passing through one side only, a supporting wall, a screw passing through the grommet into the supporting wall, a plate attached to the loop under the front end portion of the grommet, and a trim member detachably mounted on said plate, said trim member having an open rear portion and being provided with means whereby the trim member is slidably interlocked with the plate.

15. In an assist loop assembly, a flexible strap in the form of a continuous loop having a grommet passing through one side only, a supporting wall, a screw passing through the grommet into the supporting wall, a trim member having a clip portion extending across the outer unattached side of the loop, said trim member being open at the rear, and a wall attached mounting member with which the trim member has slidable relation.

16. In an assist loop assembly, a flexible strap in the form of a continuous loop having a grommet passing through one side only, a supporting wall, a screw passing through the grommet into the supporting wall, a trim member having a clip portion extending across the outer unattached side of the loop, said trim member being open at the rear, and a mounting member with which the trim member has slidable relation, said mounting member comprising a plate held in place under the head of said screw and provided with stop means limiting the movement of the trim member when the latter is assembled.

17. In an assist loop assembly, a loop of strap material having side portions adapted for swinging movement in the plane of the strap material, a supporting wall, a headed fastener passing through one side only of the loop into said wall, a spring for controlling the angular position of the loop relatively to the wall, spring mounting means behind the loop adjacent the fastener, and a member for taking the pull of the upper part of the loop held in place adjacent and under the head of the fastener between the side portions of the loop and swinging with the loop under the direct thrust of said spring.

18. In an assist loop assembly, an endless strap in the form of an elongated loop, a supporting wall therefor, a headed fastener passing through one side only of the loop into said wall for pivoting the loop to the wall, and a member for taking the pull on the upper part of the loop having a hole by which it is held in place by the fastener adjacent and under the head of the latter, said member being mounted to swing with the loop.

19. In an assist loop assembly, a flexible looped strap having a grommet extending through at least one of its side portions, a supporting wall, a screw passing through the grommet into the supporting wall for pivotally connecting the loop member with the wall, and a load-sustaining member for taking the pull on the upper part of the loop permanently mounted on the loop and fixed against movement lengthwise of the loop material and having pivotal engagement with said screw.

20. A device such as set forth in claim 19 in which the load-sustaining member is constituted by a plate held to the loop under one of the grommet flanges.

21. In an assist loop assembly, a flexible strap in the form of an endless portable loop, a supporting wall, a pivoting member passing through one side portion of the loop into the supporting wall, a spring back of the loop adapted to hold the loop in a predetermined angular position, and a load-sustaining plate for taking the pull on the upper part of the loop arranged to swing with the loop and having a part extending through the loop fabric into cooperation with said spring.

22. A metal fixture for assist loops of strap material, comprising a stop plate adapted to take the pull on the upper part of the loop and a retaining member for the outer portion of the loop having detachable sliding engagement with said plate.

ARTHUR CLAUD-MANTLE.